United States Patent [19]
Derks et al.

[11] Patent Number: 4,685,946
[45] Date of Patent: Aug. 11, 1987

[54] METHOD FOR THE MANUFACTURE OF GLASS BODIES

[75] Inventors: Pierre L. L. M. Derks, Eindhoven, Netherlands; Bernhard Lersmacher, Aachen; Hans-Jürgen Lydtin, Stolberg, both of Fed. Rep. of Germany

[73] Assignee: U.S. Philips Corporation, New York, N.Y.

[21] Appl. No.: 843,900

[22] Filed: Mar. 25, 1986

[30] Foreign Application Priority Data
Mar. 29, 1985 [DE] Fed. Rep. of Germany ....... 3511452

[51] Int. Cl.$^4$ .................................. C03B 37/016
[52] U.S. Cl. .................................. 65/17; 65/2;
65/3.11; 65/3.12; 65/18.4; 65/900; 65/901;
156/DIG. 108; 264/23; 264/176 R; 264/176.1;
501/12
[58] Field of Search ............... 65/2, 3.11, 3.12, 17,
65/18.1, 18.3, 18.4, DIG. 16, 900, 901; 501/12;
156/DIG. 108; 264/23, 56, 65, 176 R, 104, 27;
425/376 R

[56] References Cited
U.S. PATENT DOCUMENTS

| | | | |
|---|---|---|---|
| 3,285,786 | 11/1966 | Katz | 264/104 X |
| 3,665,064 | 5/1972 | Mosier et al. | 264/104 |
| 3,966,381 | 6/1976 | Suh | 425/376 R |
| 4,420,294 | 12/1983 | Lichtinghagen | 264/27 |
| 4,451,116 | 5/1984 | Pinnow et al. | 65/2 X |
| 4,541,855 | 9/1985 | Scherer | 65/18.1 |

FOREIGN PATENT DOCUMENTS

| | | | |
|---|---|---|---|
| 59-131538 | 7/1984 | Japan | 65/18.1 |
| 59-152235 | 8/1984 | Japan | 65/2 |
| 60-54928 | 3/1985 | Japan | 65/17 |

Primary Examiner—Robert L. Lindsay
Attorney, Agent, or Firm—Norman N. Spain

[57] ABSTRACT

Method and equipment for the manufacture of glass bodies wherein a porous green body is formed by extrusion from the starting material for the glass body in the form of a plastic mass and this green body is then purified and sintered, the plastic mass being transformed into a state of reduced viscosity by the application of mechanical forces utilizing the thixotropic effect and being extruded in this state.

6 Claims, 5 Drawing Figures

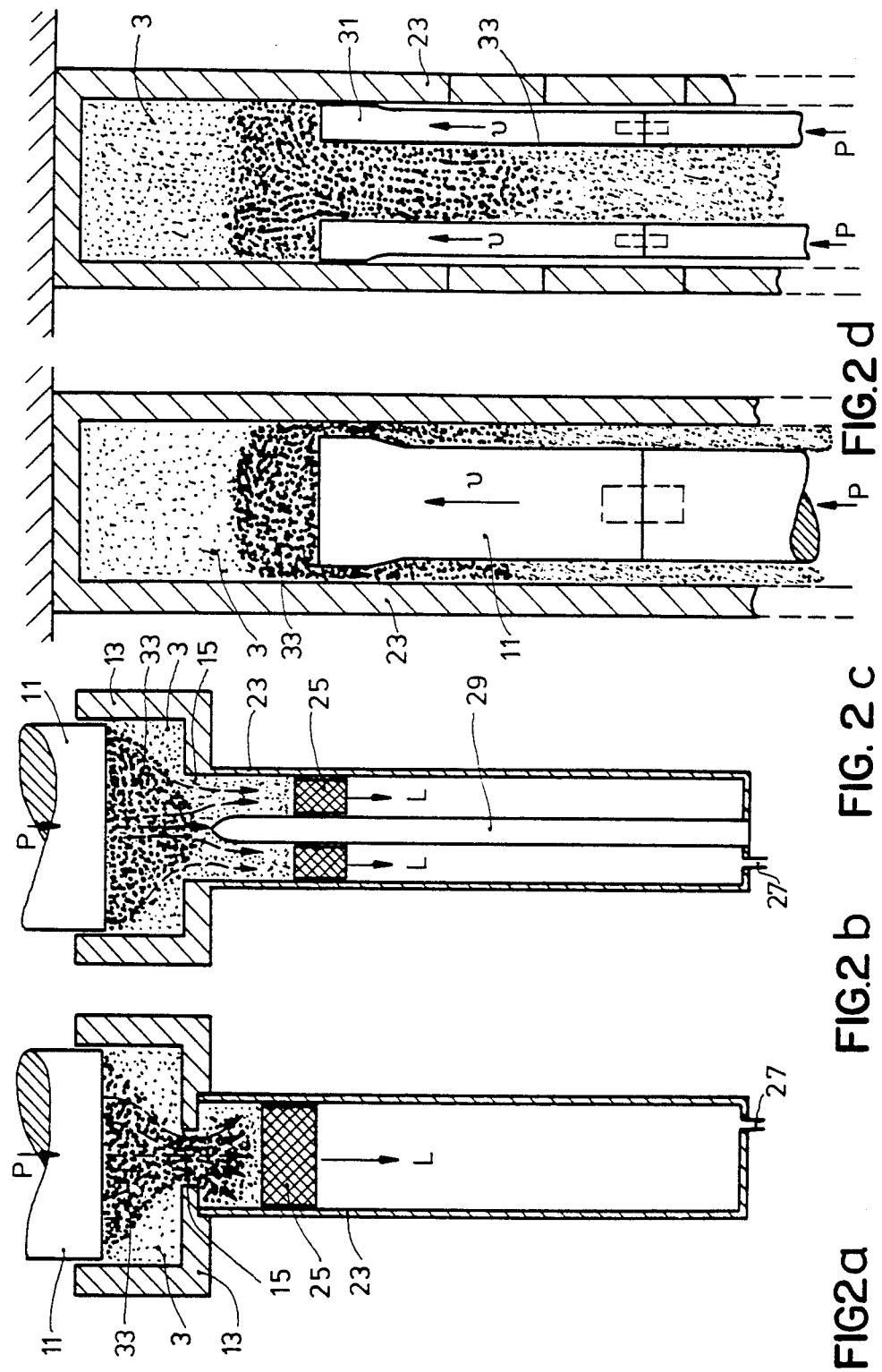

METHOD FOR THE MANUFACTURE OF GLASS BODIES

BACKGROUND OF THE INVENTION

The invention relates to a method for the manufacture of glass bodies wherein a porous green body is formed by extrusion from the starting material for the glass body in the form of a gel and this green body is then purified and sintered.

The invention also relates to equipment for implementing such a method and applications of the glass bodies produced by the method according to the invention.

The method referred to in the preamble is particularly suitable for the production of rods and especially tubes of fused silica, e.g. as preforms for optical waveguides.

Optical waveguides are used for a variety of applications, either for short-distance or long-distance light-transmission systems as in the case of optical communications systems and consist mainly of a glass of high silica content (which, if necessary, contains a doping agent for adjusting the refractive index of the glass).

The British Patent No. GB 10 10 702 describes a method in which pure or practically pure powdered $SiO_2$ with a liquid binder in a quantity of 1 to 50 wt. % and, where appropriate, a further lubricant to promote the extrusion process, in a quantity of 0.1 to 10 wt. % per $SiO_2$ content is worked into an extrusion mass and formed by an extrusion process. The liquid binders which may be used are, for example, organic liquids such as polyvinyl alcohol or water. This method corresponds to the ceramic technique in which ground, powdered raw materials with grain diameters of $>1$ $\mu$m are processed with water, binders and lubricants into high-viscosity extrudable gels.

In the processing of highly disperse starting powders with grain diameters of $<1$ $\mu$m (which can not be produced by conventional grinding processes), such as are used for the manufacture of fused silica bodies (particularly for preforms of optical waveguides) problems arise with the mixing and/or kneading particularly when the starting compounds contain a high propotion of disperse phase because then a much large number of particles have to be uniformly distributed and a correspondingly large surface has to be uniformly covered with the additives (binders and lubricants). Thus, for example, the typical mixing and kneading times for a starting mass of highly disperse fused silica particles (10 to 100 nm particle diameter) with 60 wt. % $SiO_2$ and 36 wt. % water (residue of additives) are one to three hours. In addition to this substantial time requirement for homogenization of an extrudable starting mass, there is a further problem: The gels to be processed, with $SiO_2$ powders as the main constituent and water as the dispersing agent, prove to be extremely complex formations rheologically, and it is practically impossible to predict how they will behave in the forming process.

It has been shown that even slight differences in composition and pretreatment and storage of the gels have extremely marked influences on the behaviour during extrusion. This will be illustrated here with the example of two gels of almost identical composition and treatment (cf Table I):

TABLE I

| | Composition | Mixture 1 | Mixture 2 |
|---|---|---|---|
| 1. | Highly disperse $SiO_2$ with a particle size in the range from 10 to 500 nm | 400 g | 400 g |
| 2. | Water (dispersing agent) (solids:water = 1:2) | 224 g | 222 g |
| 3. | Wetting agent (e.g. polyvinylalcohol) | 1.0 g | 0.8 g |
| 4. | Lubricant (e.g. butylstearate) | 25.0 g | 25.0 g |
| 5. | Kneading and homogenization time t | 4.0 h | 3 h 35 min |
| 6. | Total mass M | 650 g | 647.9 g |
| 7. | Product $M \cdot t = K^*$ | 2600 | 2332 |

*The Figure $K = M \cdot t$ is an arbitrarily selected quantity which designates the degree of homogenization.

Despite this almost identical composition and (except for the kneading time t) almost identical pretreatment there were found to be considerable differences during the extrusion. The data given in Table II below relate to a cold extrusion from the two mixtures of approximately 20 cm in length and 1.6 cm diameter using state-of-the-art extrusion equipment.

TABLE II

| Parameters | Mixture 1 | Mixture 2 |
|---|---|---|
| Exit force $P_o$ | 247 N | 7002 N |
| End force $P_1$ | 2505 N | 25000 N |
| Feed rate of blank $\bar{v}$ | 1.9 cm/s | 1.0 cm/s |

In Table II, $P_o$ signifies the minimum force applied resulting in the exit of the blank, $P_1$ is the maximum force required for quantitative extrusion of the blank. During the extrusion (in the time t=10 s or t=20 s) the pressure had to be increased continuously.

This considerably differing behaviour of the two gels indicates that the flow or deformation behaviour corresponds to that of a so-called intrinsically viscous medium. The reversible and irreversible processes in gels of the above-described type, associated with the Ostwald definition of intrinsic viscosity, are responsible for the problems occurring during the extrusion.

SUMMARY OF THE INVENTION

An object of the invention is to create a method, and equipment for implementing this method, with which it is possible to produce dimensionally stabilized green bodies by extrusion from starting material for glass bodies in the form of a relatively high-viscosity plastic moulding mass with a solids content of highly disperse particles.

The invention achieves this aim by the fact that the gel is transformed into a state of reduced viscosity by use of the thixotropic effect and the action of mechanical forces and is extruded in this state.

An extruding press for the implementation of this method is characterized by an extrusion ram with which a sound or ultrasound field can be introduced into a plastic moulding mass, the ram consisting preferably of an oscillator, an oscillation amplifier coupled to the oscillator via a support ring at the nodal point and a sonotrode by which the ultrasound can be introduced into the plastic mass to be extruded.

The invention is based on the recognition that in the case of a gel with highly disperse $SiO_2$ powders as the main constituent and $H_2O$ as the dispersing agent the thixotropic effect can be used to transform the plastic mass first of all by the action of mechanical forces, preferably sound or ultrasound, into a state of low viscosity, thus permitting an extrusion process which requires a very much lower extrusion pressure as if a rheologically constant mass were to be extruded.

It was found, surprisingly, that highly filled gels, the solids content of which consists mainly of highly disperse $SiO_2$ particles can be transformed into a state of lower viscosity and therefore almost unrestricted formability practically regardless of their composition, pretreatment (mixing and homogenizing processes) and storage time (exposure to air or other atmospheres - moist places -) if these gels are subjected to sound or ultrasound. It has also been shown that the amplitude and therefore the energy of the sound waves introduced determines the propagation of the softening front starting from the sonotrode. For a 1.5 kW ultrasound generator with a fundamental frequency of $f=20$ kHz it has been found experimentally that doubling the amplitude of the fundamental oscillation increases the propagation rate of the softening front by a factor of 3 to 4. This effect can be utilised to produce tubular bodies by extrusion through an annular gap into suitable moulds or rod-shaped bodies by extrusion of the highly softened masses through nozzles into suitable containers.

According to a further advantageous embodiment of the method the starting material used for the glass body is a gel which contains $SiO_2$ particles having a diameter in the range from 10 to 500 nm, preferably 15 to 100 nm, with an average particle diameter of 40 nm, a gel with a solids: water weight ratio of 1:1.5 to 1:1.8 being used. This has the advantage that despite the relatively high filling with highly disperse solid particles very homogeneous, highly compacted green bodies can be produced from such a material by an extrusion process.

According to a further advantageous embodiment of the method according to the invention, the gel is transformed into a state of reduced viscosity by introducing a sound field with a frequency f in the range from 20 to 200 Hz or by introducing an ultrasound field with a frequency f in the range from 20 to 50 kHz. A gel-sol transformation occurs in thixotropic systems with any form of mechanical action, e.g. even stirring or shaking. If, for the purpose of liquefying a high-viscosity starting material, a sonic or ultrasonic oscillator is used the amplitude of which is dimensioned in such a way that the sonic or ultrasonic field is introduced into the starting material being liquefied, this results in a particularly effective dissolution of packing cavities in the starting material. Even those gels which under continuous pressure were not able to be extruded into billets or tubes in conventional extrusion methods even with the use of pressing forces in the order of $3.10^4 N$, but which solidified completely, underwent some kind of softening in practically all cases when they were subjected to sound energy.

This means that an intrinsically viscous gel with a relatively high content of highly disperse solids particles can be deformed in an extruder with relatively little pressure because it acquires the consistency of lubricating grease as the result of thixotropy due to the action of mechanical fordes.

The special advantages which the invention brings about are these: green bodies can be produced in a continuous process with any cross-sectional shape and also in large lengths; it is possible to manufacture a multicomponent glass and the manufacturing equipment is not especially expensive.

BRIEF DESCRIPTION OF THE DRAWING

In the drawings:
FIGS. 2a, 2b, 2c and 2d are transverse sections of molds employed with the extruding press of the invention.

DETAILED DESCRIPTION OF THE INVENTION

Figure 1:
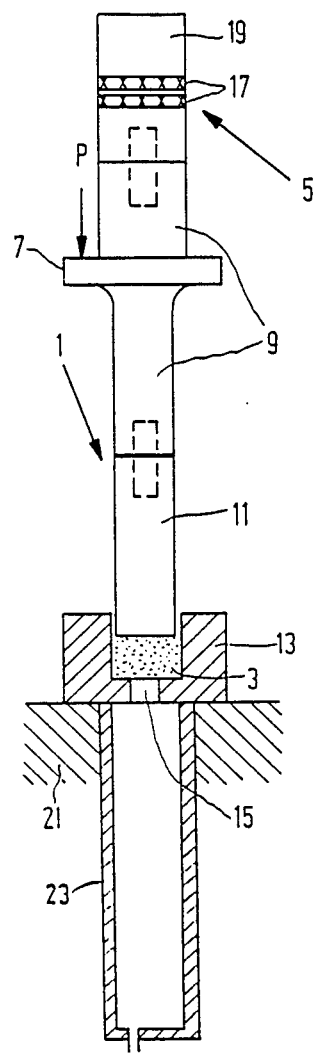
FIG. 1 is a diagrammatic view of an extruding press of the invention.

FIG. 1 shows part of an extruding press with an extrusion ram 1. The extrusion ram 1 is made up of several parts, namely an oscillator 5 operating in the ultrasound range at a frequency f of 20 kHz, an oscillation amplifier 9 coupled to a supporting ring 7, which is used to transmit the pressure p, at the oscillation node and a sonotrode 11 by means of which the ultrasound field can be introduced into the gel 3 being extruded.

On the surface lying opposite the supporting ring 7 the oscillator 5 has an oscillation damping part which consists of a spacer 17 of piezoelectric ceramic and a metallic reflector 19.

The gel 3 to be extended is placed in a die 13 which has an exit hole 15. The extrusion ram 1 with its sonotrode 11 slide-fits into the die 13. When the ram 1 is advanced under pressure p, the gel, with that part of it 33 which has been transformed into a state of reduced viscosity by the action of ultrasound, enters a cylindrical mould 23 arranged in a holder 21 via the exit hole 15 (cf FIGS. 2a and 2b). A spring-loaded float element 25 is inserted into mould 23 with a slide fit; the float element is supported on an air cushion and, when the ram 1 is advanced, moves in the direction of an air-exit hole 27 at the other end of the closed mould 23. By regulating the exit of air at the air-exit hole 27 a counterforce can be built up in the mould 23 which makes it possible to compensate for the dead weight of the extruded mass 33 and thereby prevents the die-formed article from separating in the form of a solid cylinder. In FIG. 2b, a core 29 is arranged centrically in the mould 23 and this enables tubular green bodies to be extruded. For this case and float element 25 is designed as a hollow cylinder and encloses the core 29 with a slide fit.

FIGS. 2c and 2d show a mould 23 which makes it possible to manufacture long rods (FIG. 2c) and long tubes (FIG. 2d). In this arrangement the sonotrode is in the form of a solid cylinder (sonotrode 11) for the manufacture of tubes or in the form of a hollow cylinder (sonotrode 11) for the manufacture of rods.

In the environment of the contact surface of the sonotrode 11, 31 the gel to be extruded 3 comprises an amount of material 33 which has a reduced viscosity compared with the mass 3. When the sonotrode 11, 31 is advanced at a rate in the direction of the arrow, the lower-viscosity material 33 can flow into the space between the wall of mould 23 and sonotrode 11.

If, as illustrated in FIG. 2d, a sonotrode 31 in the form of a solid cylinder which is slide-fitted into the mould 23 is used, the lower-viscosity compound 33 can flow at a rate of advance in the direction of the arrow into the inside of the sonotrode 31 and a rod-shaped green body is obtained. It is expedient for the mould 23 to be made of detachable, dismountable tubular parts which can be removed after the exit of the die-formed article in order to reduce the wall friction.

Compositions for extrusion such as are given in Table I were produced in practical embodiments. As a result of several different mixing treatments and relatively long storage with reduced air admission (up to 20 days) the compositions exhibited very considerable solidification becoming hard, brittle. The compositions could not be extruded in a normal extrusion plant, but solidified even more strongly when this was tried. The forces or pressures applied at the die mouth (diameter of the die mouth 1.6 cm) were up to $P_{max}=30000$ N ($=p\approx1.5\times10^8$ Pa $\hat{=}1.5\times10^3$ bar).

The same compositions were then subjected to a sonic treatment under the following conditions in the extrusion press of the invention illustrated in FIG. 1: a quantity of approximately 50 cm$^3$ of the respective compound was filled up to a level of approximately 3 cm in the filling space of the die (diameter 5 cm). The sonotrode of an ultrasonic generator for 20 kHz with a maximum acoustic power of $N_s=1.5$ kW (efficiency 90%) was then pressed on to the compound with a pressure of $p\approx5.10^5$ Pa $\hat{=}5$ bar. The oscillation amplitude of the sonotrode was set at 7 $\mu$m and the composition was exposed to sonic radiation for approximately 20 s under these conditions. In the immediate environment of the contact surface at the sonotrode bottom the exposed composition softened to the consistency of lubricating grease. Under pressure p the softening front migrated in approximately 20 s, i.e. at a mean propagation rate of $\overline{v}\approx1.5$ mm/sec. through the filling quantity as far as the exit hole in the die; the exit hole had a diameter of 8 mm; a total quantity of compound with reduced viscosity of approximately 1.5 cm$^3$ emerged in the form of an approximately 3 cm long billet at the exit hole. In a further embodiment, the oscillation amplitude of the ultrasonic generator wat set at 15 $\mu$m-all the other parameters mentioned for the above example being retained. Under these conditions the softening front in the composition to be extruded migrated this time at a propagation rate $v\approx4$ to 6 mm/s through the filled composition which was extruded practically quantitatively through the exit hole of the die in the above-mentioned consistency of lubricating grease.

The green bodies extruded in this way had a density of $\approx50\%$ of the density of compact fused silica and were porous so that after they had been dried troublesome impurities, particularly OH-ions and ions or particles of the transition metals, could be largely removed in a subsequent purification phase in a heated clorine-containing gas atmosphere at high temperature. The purified green body was then sintered and densified. The glass body produced had a density of 2.20 g/cm$^3$ and was free from bubbles and reams.

These glasses, which are suitable for optical waveguides, can also be advantageously used for the manufacture of envelopes for halogen or gas discharge lamps because these glasses, like the glasses for optical waveguides, must be practically water-free and must have a high silica content.

What is claimed is:

1. A method for the manufacture of a glass body comprising:
    (a) applying mechanical force to a gel formed from a thixotropic suspension of SiO$_2$ particles to reduce the viscosity of said gel,
    (b) forcing said gel, while in said reduced viscosity state, through a die to form an extruded porous green body; and
    (c) purifying and sintering said green body to form a glass body.

2. The method as claimed in claim 1, wherein the gel contains SiO$_2$ particles having a diameter in the range from 10 to 500 nm with an average particle diameter of 40 nm.

3. The method as claimed in claim 1 wherein the gel has with a solids:water weight ratio of 1:1.5 to 1:1.8.

4. The method as claimed in claim 1, wherein the gel is transformed into a state of reduced viscosity by the introduction of a sound field with a frequency f in the range from 20 to 200 Hz or by the introduction of an ultrasound field with a frequency f in the range from 20 to 50 kHz.

5. The method as claimed in claim 1, wherein the gel is extruded in an extruding press with a ram in the form of a sonotrode of a sonic or ultrasonic generator with a pressure p in the range from 1 to 7.10$^5$ Pa in the case of an oscillation amplitude of the sonotrode in the range from 0 to 60 $\mu$m.

6. The method of claim 2, wherein the gel contains SiO$_2$ particles having a diameter in the range of from 15 to 100 nm.

* * * * *